C. E. OGDEN.
SWITCHBOARD FOR CHARGING STORAGE BATTERIES.
APPLICATION FILED SEPT. 9, 1918.

1,327,682.

Patented Jan. 13, 1920.

Inventor:
Clarence E. Ogden,
By Arthur H. Ewald,
Attorney.

UNITED STATES PATENT OFFICE.

CLARENCE E. OGDEN, OF CINCINNATI, OHIO.

SWITCHBOARD FOR CHARGING STORAGE BATTERIES.

1,327,682.　　　　　Specification of Letters Patent.　　Patented Jan. 13, 1920.

Application filed September 9, 1918. Serial No. 253,167.

*To all whom it may concern:*

Be it known that I, CLARENCE E. OGDEN, a citizen of the United States, and a resident of Cincinnati, in the county of Hamilton and State of Ohio, have invented certain new and useful Improvements in Switchboards for Charging Storage Batteries, of which the following is a full, clear, and exact description, reference being had to the accompanying drawings, forming a part of this specification.

My invention relates to improvements in switchboards for the charging of storage batteries, and it is directed particularly to the provision of a switchboard adapted for the charging of the batteries of electric-baggage and industrial trucks, tractors and locomotives.

In the charging of the batteries of electrical trucks, tractors and locomotives, since in the batteries of these vehicles comparatively few cells are employed, there results a large loss of current when the battery of a single vehicle is charged from a direct current circuit of commercial voltage. This loss may be cut down or entirely eliminated by charging in series pluralities of batteries up to and including the number permitted by the line voltage. The principal object of my invention is therefore to provide a switchboard in which simple means for connecting various numbers of batteries in series are provided thus making it possible to limit the wastage referred to.

I am aware that series charging of batteries of the kind referred to has heretofore been practised, but the means employed have been very complicated requiring a series of knife switches, and in such arrangements, where a wrong switch is closed serious trouble results. The present invention is designed to achieve the results mentioned in a more simplified manner, as will be herein fully disclosed.

A further object of the present invention is to provide in a switchboard of the character mentioned, a system of wiring wherein a voltmeter may be permanently introduced for testing the voltage of either one or a plurality of storage batteries during the process of charging said batteries.

Further objects of this invention will be apparent to those skilled in the art from the following detailed description thereof.

Figure 1:
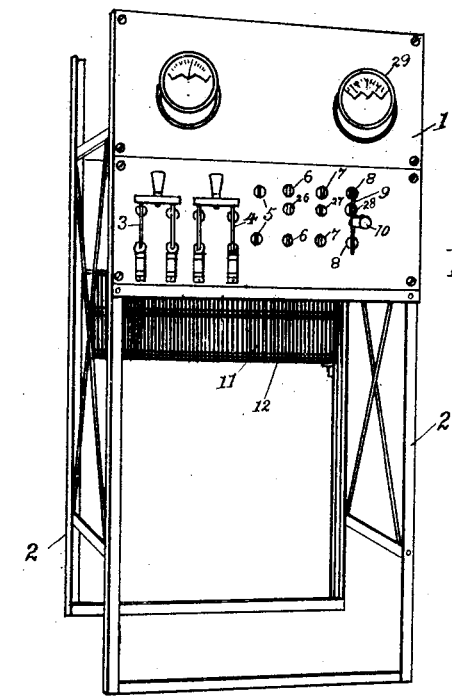
Figure 1 is a perspective of a switchboard constructed in accordance with the present invention.
Figure 3:
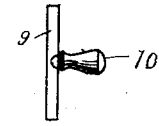
Fig. 3 is a detail of the contact bar.
Figure 2:
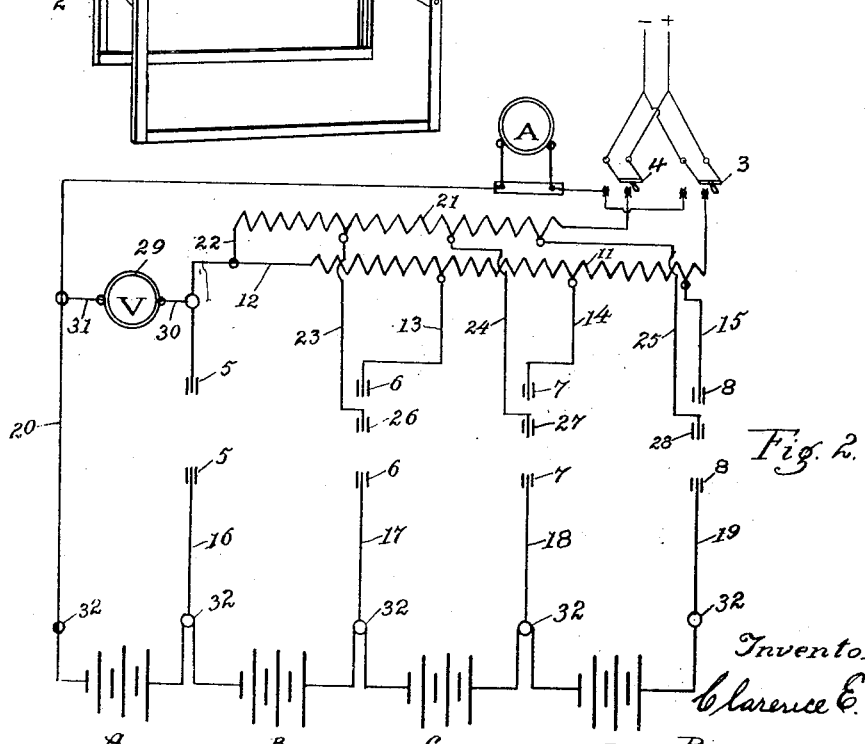
Fig. 2 is a diagrammatic view of the said switchboard and connections.

The numeral 1 indicates a board of suitable material and construction, the same being provided with supporting standards 2 when desired. The board 1 is provided with the necessary switch levers and contacts for one or more line circuits and for the charging of one or more storage batteries. In the present instance, I have shown in Fig. 1 the board provided with line switches 3 and 4, and with contacts for the charging of from one to four storage batteries. Two contacts are provided on the switchboard for each battery within the capacity of the board. Thus in the present illustrated case contacts 5—5 are provided for the charging of one battery, 6—6 for the simultaneous charging of two batteries, 7—7 and 8—8 for the simultaneous charging of three and four batteries respectively. Each of the said contacts consists of double leaf springs between which a knife bar 9 may be inserted to connect the same. The bar 9, as illustrated in detail in Fig. 3, is provided with a handle 10, by means of which the same may be removed from, and inserted in, any of the contacts.

The board 1 is provided with a resistance grid 11 in the circuit of switch 3, the said resistance being connected by means of wires 12, 13, 14 and 15, at suitable intervals to one of each of the pairs of contacts 5, 6, 7 and 8, respectively. The other contacts 5, 6, 7 and 8 are connected by means of wires 16, 17, 18, 19 to the respective battery plugs for 1, 2, 3 or 4 batteries. By this arrangement, as will be seen, one or more (up to four) storage batteries may be charged. The batteries are indicated in the drawings by the letters A, B, C and D. When only the battery A is to be charged, the circuit is through the entire resistance 11 through the wire 12, bar 10 connecting the contacts 5, wires 16, battery A and wire 20 back to the line. When a plurality of batteries, for instance, three, are to be charged simultaneously, two-thirds of the resistance 11 is eliminated; when the limit of capacity of the board is reached in the charging of four batteries the resistance 11 is almost entirely cut out.

It is often desired and in many cases necessary, to boost a battery in a limited time as at noon or when the vehicle is idle, as this adds materially to its capacity for work. This invention permits this to be done very readily and in an extremely simple manner.

For this purpose the second line circuit connected by the switch 4 is provided. This circuit is provided with resistance 21, which is connected by means of a wire 22 to the wire 12. The said resistance is, furthermore, connected by means of wires 23, 24 and 25, respectively, with contacts 26, 27 and 28, on the board. The contacts 26, 27 and 28 are similar to the contacts 5, 6, 7 and 8, and are positioned respectively intermediate the pairs of contacts 6, 7 and 8, as shown, so that when the knife 10 is placed in either pair of contacts it will also engage the corresponding contact 26, 27 or 28. Resistance 21 operates in connection with the line circuit controlled by switch 4 in the charging of one or a plurality of batteries in identically the same manner as resistance 11, which has already been explained. When both the line circuits controlled by the switches 3 and 4, are connected, it will be seen that the battery or batteries charged will receive just twice the amperage received when only one switch is connected.

A voltmeter 29 is mounted on the board 1, and is connected by means of wires 30 and 31, respectively, to the wires 12 and 20. As will be seen, the said meter is thus introduced into the system in such a manner that it will indicate the voltage passing through one or any plurality of batteries being charged.

Suitable terminals 32 are provided for connecting the batteries to be charged.

The operation of the present invention will be apparent to those skilled in the art from the foregoing description. By the arrangement described, it will be seen that it is possible to charge one battery, or simultaneously in series a plurality of batteries up to the limit permitted by the line voltage, if desired. In order to make the necessary connections for one or any number of batteries, it is only necessary to shift the knife bar 10 to the contacts provided for the number of batteries to be charged, and as the board is provided with a set of contacts for each battery within the limit of the board, the proper placing of the knife is a matter of great simplicity, thus eliminating almost entirely the possibility of error in this regard. The voltmeter indicates at all times the voltage of the battery, or batteries, being charged and thus indicates their condition. By means of the provision of switches and connections for more than one line circuit, the charging rate can be increased, thus reducing the time required for charging the battery or batteries.

Having thus described my invention, what I claim as new and desire to secure by Letters Patent, is:

1. A switchboard for charging storage batteries, comprising a line circuit, resistance arranged to be introduced into said circuit, connections for a plurality of storage batteries, a contact on said board for each number of batteries to be charged within the capacity of the line circuit, said contacts being permanently connected with said resistance at points adapted to the charging of the correlated number of batteries automatically to introduce when either is closed the required resistance for the charging of its number of batteries, and means for closing the circuit through any one of said contacts, whereby the correlated number of batteries may be charged.

2. A switchboard for charging storage batteries, comprising a line circuit, resistance arranged to be introduced into said circuit, connections for a plurality of storage batteries, a contact on said board for each number of batteries to be charged within the capacity of the line circuit, said contacts being permanently connected with said resistance at points adapted to the charging of the correlated number of batteries automatically to introduce when either is closed the required resistance for the charging of its number of batteries, means for closing the circuit through any one of said contacts whereby the correlated number of batteries may be charged, and a switch on said board to control said line circuit.

3. A switchboard for charging storage batteries, comprising a line circuit, resistance arranged to be introduced into said circuit, connections for a plurality of storage batteries, a contact on said board for each number of batteries to be charged within the capacity of the line circuit, said contacts being permanently connected with said resistance at points adapted to the charging of the correlated number of batteries automatically to introduce when either is closed the required resistance for the charging of its number of batteries, means for closing the circuit through any one of said contacts, whereby the correlated number of batteries may be charged, and a voltmeter permanently connected in circuit with the entire resistance.

CLARENCE E. OGDEN.